United States Patent [19]

Linnert

[11] Patent Number: 4,957,517
[45] Date of Patent: Sep. 18, 1990

[54] SOUND ATTENUATING LIQUID-GAS SEPARATOR

[75] Inventor: Peter J. Linnert, La Crosse, Wis.

[73] Assignee: American Standard Inc., New York, N.Y.

[21] Appl. No.: 345,147

[22] Filed: Apr. 28, 1989

[51] Int. Cl.⁵ .............................................. B01D 19/00
[52] U.S. Cl. ........................................ 55/184; 55/203; 55/276; 55/457; 62/84; 62/470
[58] Field of Search ................ 55/184, 203, 207, 276, 55/456, 457, 459.1

[56] References Cited

U.S. PATENT DOCUMENTS

| | | |
|---|---|---|
| 338,772 | 3/1986 | Polte . |
| 1,360,349 | 11/1920 | Wright . |
| 1,973,063 | 9/1934 | Grier .................................. 55/457 X |
| 2,147,671 | 2/1939 | Pratt ................................... 55/457 X |
| 2,600,262 | 6/1952 | Powers ................................... 55/276 |
| 3,151,961 | 10/1964 | Blackmore et al. ................... 55/205 |
| 3,161,490 | 12/1964 | Dudek ................................... 55/205 |
| 3,248,860 | 5/1966 | Carlson ............................ 55/457 X |
| 3,336,732 | 8/1967 | Carroll ................................. 55/201 |
| 3,545,179 | 12/1970 | Nelson et al. .......................... 55/276 |
| 3,641,745 | 2/1972 | Moore ................................. 55/345 |
| 3,654,748 | 4/1972 | Bloom ............................ 55/456 X |
| 3,778,984 | 12/1973 | Lawser ................................. 55/333 |
| 3,915,679 | 10/1975 | Roach et al. ........................... 55/347 |
| 3,917,474 | 11/1975 | Heckenkamp et al. ................ 55/332 |
| 4,070,168 | 1/1978 | Beattie ................................. 55/205 |
| 4,142,380 | 3/1979 | Dyhr et al. ........................... 62/471 |
| 4,162,904 | 7/1979 | Clay et al. ............................ 55/276 |
| 4,187,089 | 2/1980 | Hodgson .............................. 55/219 |
| 4,255,099 | 3/1981 | Komori ................................ 418/97 |
| 4,313,715 | 2/1982 | Richardson, Jr. ................. 55/276 X |
| 4,405,345 | 9/1983 | van Oorschot ........................ 55/184 |
| 4,582,468 | 4/1986 | Bar ................................. 55/276 X |
| 4,622,048 | 11/1986 | Roberts et al. ........................ 55/199 |
| 4,662,190 | 5/1987 | Tischer ................................. 62/470 |
| 4,690,759 | 9/1987 | Mandy ............................ 55/184 X |
| 4,762,469 | 8/1988 | Tischer ................................. 417/279 |
| 4,780,061 | 10/1988 | Butterworth ......................... 417/371 |

FOREIGN PATENT DOCUMENTS 3111239 10/1982 Fed. Rep. of Germany ........ 55/276

Primary Examiner—Robert Spitzer
Attorney, Agent, or Firm—William J. Beres; William O'Driscoll

[57] ABSTRACT

Sound attenuating liquid-gas separation apparatus includes nested elements which are tuned to abate noise in general and at predetermined frequencies in particular in a screw compressor assembly. The apparatus includes a helical flow path defined internal of an outer shell. The shell is selectively perforated at its downstream end to allow for the egress of separate oil from it. The apparatus includes a columnar, open-ended cylindrical member internal of the outer separator shell and a discharge conduit which penetrates both the separator shell and the open end of the columnar cylindrical member disposed within the shell to create the nesting which both contributes to the oil separation proces and abates noise. By selectively dimensioning and therefore "tuning" the nested members in accordance with the characteristics of the particular compressor with which they are used, compressor assembly noise abatement at predetermined frequencies is accomplished.

21 Claims, 3 Drawing Sheets

SOUND ATTENUATING LIQUID-GAS SEPARATOR

BACKGROUND OF THE INVENTION

The present invention relates generally to the art of compressing a gas. More particularly, the present invention relates to the compression of a refrigerant gas into which a liquid is injected during the compression process. With still more particularity, the present invention relates to the requirement to separate entrained oil from the oil-gas mixture discharged by a compressor in a refrigeration circuit. Finally, the present invention relates to apparatus for centrifugally separating entrained oil from the mixture of compressed refrigerant gas and atomized oil discharged from a screw compressor in a refrigeration circuit as well as to integral apparatus for abating the noise associated therewith.

Compressors are employed in refrigeration circuits to raise the pressure of a refrigerant gas from a suction to a discharge pressure which permits the refrigerant to be used within the circuit to cool a desired medium. Many types of compressors, including rotary screw compressors, are commonly employed to compress the refrigerant gas in a refrigeration circuit.

Two complimentary rotors, a male and a female, are located in the screw compressor housing. The compressor housing has a low pressure end which includes a suction port and a high pressure end which includes a discharge port.

In operation, refrigerant gas at suction pressure enters the low pressure end of the compressor housing and is there enveloped in a pocket formed between the rotating complimentary screw rotors. The volume of the gas pocket decreases and the pocket is circumferentially displaced as the compressor rotors continue to rotate and mesh. The gas within such a pocket is compressed, and therefore heated, by virtue of the decreasing volume in which it is contained, prior to the pocket's opening to the discharge port. The pocket, as it continues to decrease in volume, eventually opens to the discharge port in the high pressure end of the compressor housing and the compressed gas is discharged from the compressor's is working chamber.

Screw compressors used in refrigeration applications will, in the large majority of instances, include an oil injection feature. Oil is injected into the working chamber of the compressor, and therefore into the refrigerant gas being compressed therein for several reasons. First, the injected oil acts to cool the refrigerant gas undergoing compression. As a result, the compressor rotors are themselves cooled allowing for tighter tolerances, in the first instance, between the rotors and between the rotors and the rotor housing which defines the working chamber.

Further, oil injected into the working chamber of a screw compressor acts as a lubricant. One of the two rotors in a screw compressor is normally driven by an external source, such as an electric motor, with the other rotor being driven by virtue of its meshing relationship with the externally driven rotor. The injected oil transmits the drive force and prevents excessive wear between the driving and driven rotors.

Finally, oil injected into the working chamber of a screw compressor acts as a sealant between the meshing rotors and between the rotors and the working chamber in which they are contained in the compressor housing. The oil so injected creates a barrier in the various higher to lower pressure leakage paths which exist within a screw compressor and allows for tighter initial machining tolerances and/or increased efficiency within the compressor.

Oil injected into the working chamber of a screw compressor is atomized and becomes entrained in the refrigerant gas undergoing compression. Such oil, to a great extent, must be removed from the oil-rich mixture discharged from the compressor in order to make the oil available for reinjection into the compressor for the purposes enumerated above. Further, removal of excess injected oil must be accomplished to insure that the performance of the refrigerant gas is not adversely affected within the refrigerant circuit.

Screw compressors have proven to be particularly suited for use in large capacity refrigeration systems with application in 40 to 400-ton systems being common. The size of such compressors and the amount of oil injected thereinto is significant. Injection of one part oil for every five parts of circulated refrigerant by weight coupled with a requirement to remove 90% or more or the injected oil immediately upon discharge of the mixture from the compressor working chamber is typical.

There exist many applications and environments in which the compressor installation is not readily accessible or in which the opening of internal compressor components to the environment is undesirable. In such cases the refrigeration equipment, including the liquid-separation apparatus, is preferably hermetically or semi-hermetically sealed.

Liquid-gas separators have historically comprised large separator receiver combinations which have included, in many instances, baffle schemes to facilitate liquid-gas separation. Such schemes are, as indicated in U.S. Pat. No. 3,917,474 to Heckenkamp et al., neither simple nor inexpensive to fabricate. Further, many such units call for the separator element to be removable in order to allow for its cleaning or replacement.

Exemplary of a second liquid-gas separator for screw compressor applications is that found in U.S. Pat. No. 4,622,048, assigned to the assignee of the present invention and which is incorporated herein by reference. That patent, together with U.S. Pat. Nos. 4,662,190 and 4,762,469 which are likewise assigned to the assignee of the present invention and which are likewise incorporated herein by reference, disclose oil separator portions in a screw compressor assembly having a centrifugal oil separator element which is permeable along its entire length.

While the centrifugal oil separators of the immediately aforementioned patents have proven to be extremely efficient, those designs do not specifically include nor contemplate integral noise attenuation and abatement in general or with respect to certain frequencies in particular. Such noise is characteristic of compressors in general and of screw compressors in particular. Factors in the production of compressor noise including the frequency of the power used to energize the motor (50 cycle versus 60 cycle), the capacity of the compressor, and, in screw compressors, the number of lobes on the male screw rotor which is typically the driven rotor.

The need continues to exist for a highly reliable liquid-gas separator for application in a rotary screw compressor assembly which generally reduces radiated noise and which specifically abates noise at predetermined frequencies while accomplishing the separation of a large majority of the oil from the oil-gas mixture discharged from the compressor's working chamber.

SUMMARY OF THE INVENTION

It will be appreciated that it is an object of the present invention to separate an entrained liquid, such as oil, from a liquid-gas mixture.

It is another object of this invention to separate a liquid from a gas using apparatus which employs no moving parts.

It is still another object of the present invention to remove a predetermined amount of liquid from a liquid-gas mixture using the centrifugal force generated by constraining the mixture to travel along a helical path.

It is another object of the present invention to provide an oil separation section for a screw compressor assembly which includes centrifugal oil separation apparatus as well as apparatus and structure to minimize generally the noise produced and transmitted by the oil separation process and from the compressor assembly as a whole and to abate specifically noise at predetermined frequencies.

The combined oil separator and noise attenuation apparatus of the present invention includes a hermetically sealed sump housing in which a separator element including nested muffler elements are disposed. The separator element includes an outer cylindrical shell and defines an inlet and an outlet disposed generally on opposite ends of the shell. The inlet of the separator element is in flow communication with the discharge port of the compressor and the separator element therefore receives the oil-gas mixture discharged from the compressors working chamber directly.

The outlet of the separator element is in flow communication with but is physically separated from a discharge conduit which directs relatively dry refrigerant gas, from which oil has been separated, out of the oil separator portion of the compressor assembly. The separator element includes an inner generally cylindrical column having an open-ended extension in which the discharge conduit is concentrically nested.

The nesting of the cylindrical extension and discharge conduit internal of the separator element together with their physical separation reduces the amount of noise produced in and transmitted from the oil separator portion. Further, the nested components of the separator are dimensioned and spaced apart so as to be "tuned", in accordance with the characteristics of the size/capacity of the compressor with which they are used, to reduce and/or eliminate noise at certain predetermined frequencies which are characteristic of that size/capacity compressor.

In the preferred embodiment, the outer shell of the separator element defines a plurality of apertures of a predetermined size and shape located at the downstream end of the separator shell and through which oil separated from refrigerant gas passes to an oil sump. The separator element includes, in addition to the shell, a helical ramp disposed around the inner column both of which are mounted generally co-axially within the solid portion of the separator shell.

A helical passage is therefore formed within the solid walled portion of the separator shell through which a received oil-refrigerant mixture is constrained to pass between the separator element inlet and outlet. This passage is defined by the solid interior wall portion of the separator shell, the helical ramp and the central column about which the helical ramp winds within the oil separator element. The aforementioned open-ended cylindrical extension extends downstream from the inner column about which the helical ramp winds.

Liquid separated as a result of the swirling motion imparted to the mixture is carried along the solid inner wall of the shell to the downstream end of the shell where it passes through the shell holes defined therein and drains into the sump. The refrigerant gas undergoes a first generally 180° turn within the separator element around the open downstream end of the cylindrical extension and then a second generally 180° turn within the separator element around the open upstream end of the discharge conduit in order to pass out of the oil separator portion of the compressor assembly through the discharge conduit. The directional changes in the refrigerant flow path cause the further disentrainment of oil which remains in the gas with the result that the refrigerant gas passing out of the discharge conduit is relatively free of entrained oil.

Because the discharge conduit is physically separated from the oil separator element and is itself concentrically housed by the cylindrical extension of the central column of the oil separator element and because the cylindrical extension of the inner column and the discharge conduit are nested and are specifically dimensioned or tuned to eliminate or abate the production of noise in general and at predetermined frequencies in particular, a muffling effect is achieved within the oil separator portion of the compressor assembly which significantly diminishes the noise produced within and transmitted from the compressor assembly.

BRIEF DESCRIPTION OF THE DRAWING FIGURES

DESCRIPTION OF THE PREFERRED EMBODIMENT

Figure 1:
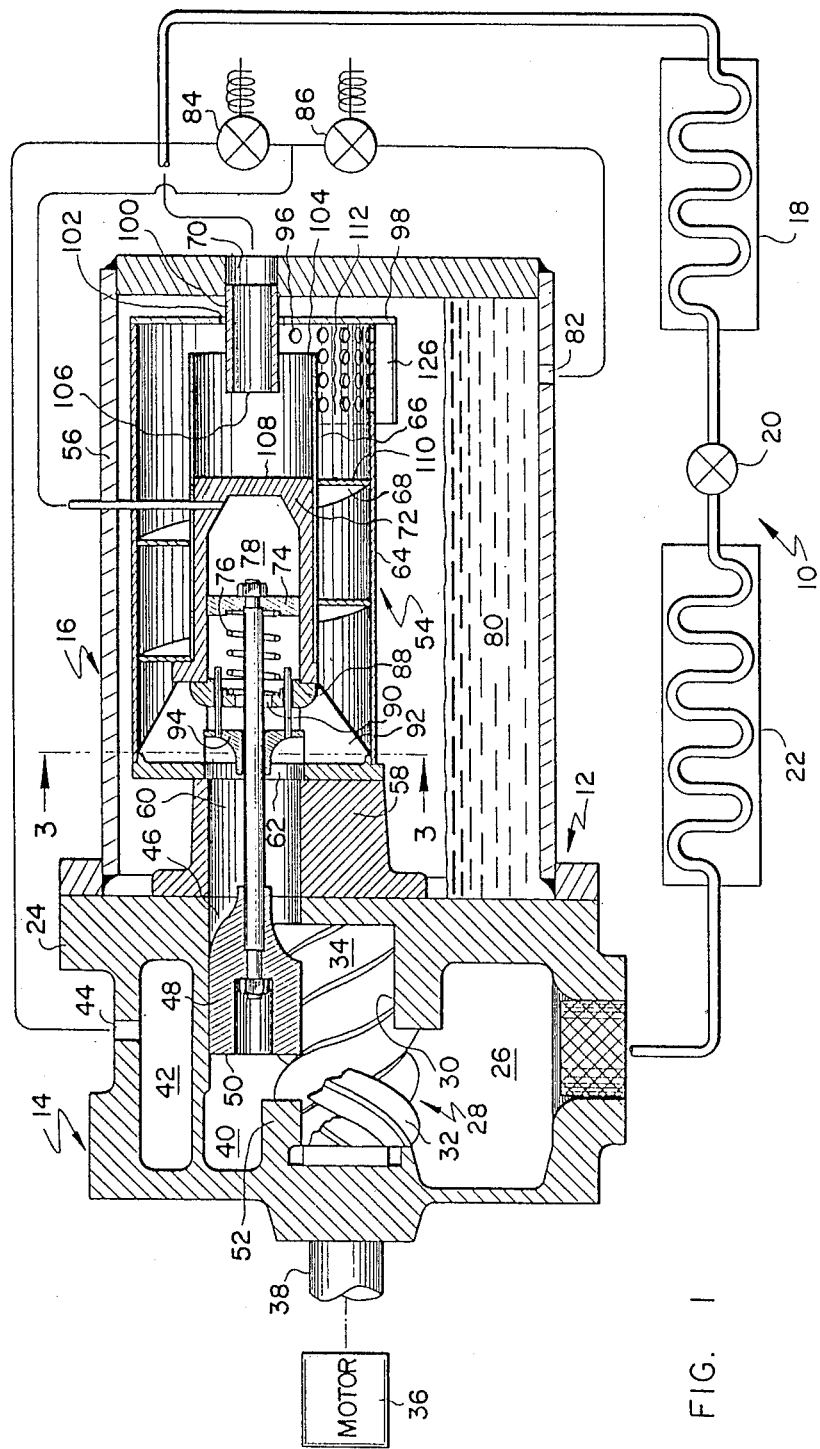
FIG. 1 is a cross sectional view of the screw compressor assembly of the present invention.
Figure 2:
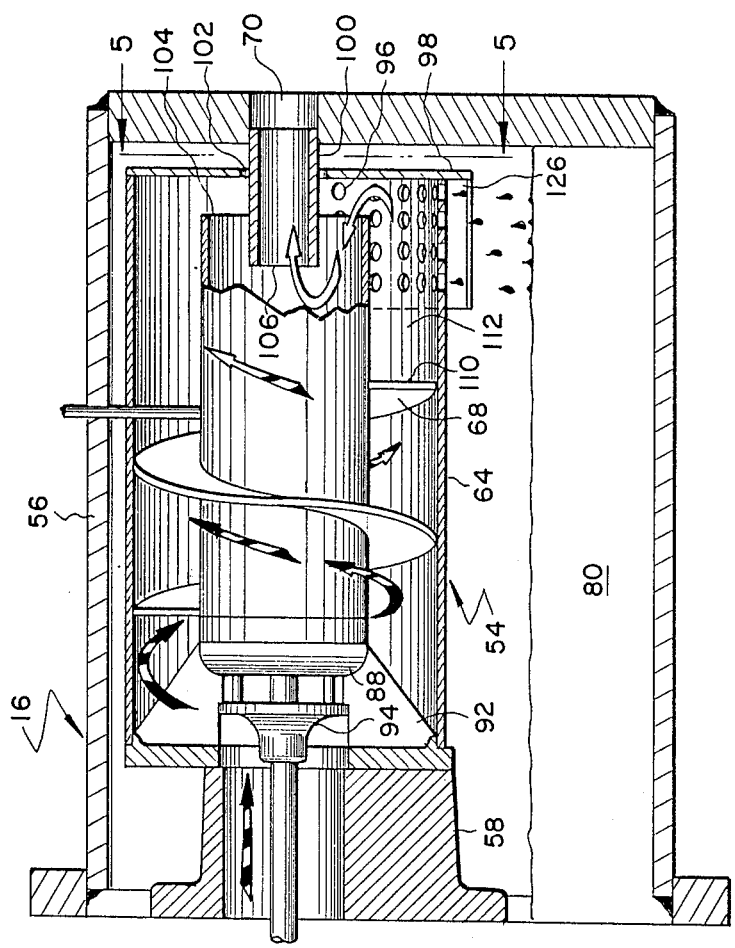
FIG. 2 is a partial cross sectional view of the oil separator portion of the assembly of FIG. 1 illustrating the flow path of refrigerant gas and oil therethrough.

Referring concurrently to both drawing FIGS. 1 and 2, a refrigeration system 10 includes a screw compressor assembly 12 which is comprised of a compressor section 14 and an oil separator section 16. Refrigeration system 10 further includes, typically, a condenser 18, an expansion device 20 and an evaporator 22. Compressed refrigerant gas, from which oil has been separated, is directed from oil separator section 16 of compressor assembly 12 to condenser 18 where it is condensed and becomes a low temperature, high pressure liquid.

From condenser 18 the refrigerant is directed to expansion device 20 where it becomes a low temperature, low pressure liquid by the process of expansion. The low pressure, low temperature liquid refrigerant next enters evaporator 22 where it is vaporized and becomes a low pressure, low temperature gas prior to being returned to compressor section 14.

Compressor section 14 includes a rotor housing 24 which defines a suction area 26 into which vaporized low pressure refrigerant gas is communicated from evaporator 22. Rotor housing 24 also defines a suction port 28 through which such gas is admitted to compressor working chamber 30 in which screw rotors 32 and 34 are housed.

Attached to the driven one of rotors 32 and 34 is motor 36 which drives shaft 38 on which the driven rotor is mounted. Suction area 26, in the preferred embodiment, includes suction subareas 40 and 42 all of which are in flow communication with rotor housing 24. Rotor housing 24 also defines an opening 44 into suction subarea 42, the purpose of which will later be described.

Rotor housing 24 further includes a discharge port 46 through which compressed refrigerant gas is discharged from working chamber 30. Disposed within rotor housing 24 and cooperating therewith to define working chamber 30 is a slide valve 48. Slide valve 48 is axially moveable with respect to rotors 32 and 34 within rotor housing 24. In the position illustrated in FIG. 1, working chamber 30 is in flow communication with suction subarea 40 of suction area 26 as well as with main suction area 26 through suction port 28. Slide valve 48 is positionable between a first position in which low pressure end face 50 of the slide valve abuts stop 52 of rotor housing 24 and a second position in which the degree to which rotors 32 and 34 are exposed to suction subarea 40 is at a maximum.

When low pressure end face 50 of valve 48 abuts stop 52 of rotor housing 24, direct flow communication between working chamber 30 and suction subarea 40 is prevented and the compressor operates at full load. The degree to which rotors 32 and 34 are exposed to suction subarea 40 is determinative of the volume of gas which will be compressed between the rotors and therefore, the load on the compressor.

Oil separator section 16 includes a centrifugal oil separator element 54 disposed within sealed oil sump housing 56. In the preferred embodiment, a bearing housing 58 defining a discharge passage 60, is disposed between the discharge port 46 of rotor housing 24 and separator element 54. Separator element 54 defines an inlet 62 in flow communication with passage 60 of bearing housing 58 and includes an outer cylindrical shell 64 which cooperates with inner cylindrical column 66 and ramp 68 to define a helical passage between inlet 62 and outlet 70 of sump housing 56.

Inner cylindrical column 66, in the preferred embodiment, accommodates a pressure housing 72 in which piston 74 and spring 76 are disposed. Piston 74 and pressure housing 72 cooperate to define a pressure chamber 78 which is capable of selective flow communication with opening 44 in rotor housing 24 or with sump area 80 of oil separator 16 through opening 82 in sealed sump housing 56.

Pressure chamber 78 is put into flow communication with opening 44 and suction subarea 42 by the opening of solenoid valve 84 or with sump area 80 by the opening of solenoid valve 86. Housing 66 has an end cap 88 which defines an opening 90 through which the face of piston 74 opposite the face which cooperates to define chamber 78 is constantly maintained in flow communication with the remainder of the interior of oil separator element 54.

Also disposed interior of separator element 54 are swirl vanes 92 and anti-rotation body 94. Body 94 is slideably mounted on the rod which connects piston 74 with an oil separator section 16 and slide valve 48 within rotor housing 24. It will be appreciated that when piston 74 moves within pressure housing 72, slide valve 48 is correspondingly moved within rotor housing 24 and further, that the movement the rod connecting the piston and slide valve does not of itself effect the movement of body 94.

As earlier mentioned, outer shell 64 of separator element 54 defines a plurality of openings or perforations 96 in the lower portion of its downstream end. These openings cooperate to form a drain field through which oil exits separator element 54 and passes to sump 80. Shell 64 and, therefore, separator element 54 are closed at their downstream ends by end plate 98 which defines an aperture into which and through generally tubular discharge conduit 100 extends. The aperture defined by end plate 98 is slightly larger than the outside diameter of discharge conduit 100 so that a gap 102 is created between the edge of the aperture in end plate 98 and the exterior surface of discharge conduit 100.

Oil separator element 54 is therefore physically separated from discharge conduit 100 with gap 102 functioning as a barrier to the development of resonant frequencies and to the conductive transmission of sound from oil separator element 54 to or into discharge conduit 100 and sump housing 56. Discharge conduit 100 is disposed, at its downstream end within outlet 70 of sump housing 56 and is fixedly connected to the sump housing as by welding or brazing.

Although not illustrated, sump housing 56 is attached to rotor housing 24 as by being bolted thereto and it will be appreciated that, if necessary, sump housing 56 can be unbolted from the rotor housing and removed therefrom. Upon removal of the sump housing, discharge conduit 100 is withdrawn through the aperture defined by end plate 98 of separator element 54 and the entire separator element and bearing housing is made accessible.

Discharge conduit 100 extends through the aperture defined by end plate 98 and a predetermined distance into the interior of separator element 54. It will be noted that ramp 68 is disposed only in the upstream portion of separator element 54 and that inner cylindrical column 66 of separator element 54 includes a generally tubular extension 104 which extends downstream of the location at which ramp 68 ends. Downstream extension 104 of inner cylindrical column 66 extends a predetermined distance toward end plate 98 of the separator element although its downstream end is physically spaced apart from the end plate. Extension 104 can be an integral physical extension of column 66 or, if preferred, may be a physically separate piece attached to the downstream end of column 66.

Discharge conduit 100 extends concentrically into the open end of extension 104 of inner cylindrical column 66, so as to be nested therein, with upstream end 106 of discharge conduit 100 being spaced apart, at a predetermined distance, from partition 108 which partitions the interior of cylindrical column 66. In the embodiment of FIG. 1 partition 108 is the upstream end face of pressure housing 72.

It should be specifically noted that the oil separation apparatus of the present invention has application in screw compressor assemblies of the type illustrated in FIG. 1 wherein pressure housing 72 houses the piston actuator 74 of the slide valve assembly as well as in screw compressor assemblies in which no slide valve compressor modulation apparatus is employed in conjunction with the oil separation apparatus. Partition 108 is a wall which operates as a barrier to the flow of gas in the direction it is travelling subsequent to making a first 180° turn around the open end of extension 104. That it is the downstream face of a pressure housing or simply a relatively thin-walled solid partition is immaterial with respect to the implementation of the present invention.

It will be noted that the upstream end 106 of discharge conduit 100 is nested within the downstream extension 104 of cylindrical column 66. This nesting, as will be appreciated from FIG. 2, forces refrigerant gas to undergo a first 180° change in direction so as to enter the downstream open end of extension 104 and a second 180° turn so as to enter discharge conduit 100 prior to exiting the oil separator portion 16. This nesting also achieves a muffling affect within the oil separator portion so that extension 104 and discharge conduit 100 can be characterized as generally tubular nested muffling means for the abatement and reduction of compressor assembly noise.

As earlier noted, the muffling means are dimensioned or "tuned" to eliminate or reduce noise at particular frequencies that are characteristic of different compressor sizes and capacities. Factors which contribute to the development of noise at particular frequencies include compressor size and capacity, the frequency of the power supply driving the compressor motor and the number of lobes on the male screw rotor which is typically the rotor driven by the motor. Those frequencies and the "tuning" of the muffler means, once again, depend primarily on the specific design of a given compressor assembly as well as the characteristic frequency of the noise generated thereby and will be determined without undue difficulty, by those skilled in the art, for the particular compressor with which they are working.

In operation, refrigerant gas is sucked into working chamber 30 through suction port 28 by the rotation and meshing of rotors 32 and 34, one of which is driven in a predetermined direction by motor 36. When motor 36 is in operation, at least a portion of the refrigerant gas sucked in through suction port 28 into working chamber 30 is compressed and discharged through discharge port 46 no matter what the position of slide valve 48. Compressed refrigerant gas is discharged from the working chamber through discharge port 46 and into discharge passage 60 of bearing housing 58.

Oil stored in sump 80 is essentially at discharge pressure when the compressor assembly is in operation due to the selective permeability of wall 64 of separator element 54 at the location of the oil drain field at its downstream end. The oil from sump 80 is further employed to lubricate the bearings and the bearing areas in which the ends of the shafts of rotors 32 and 34 are mounted in the compressor assembly.

Such lubricating oil is vented into the working chamber of the compressor after it passes through the bearings and bearing areas. Additionally, sump oil is selectively directed out of sump 80 through solenoid valve 86, when valve 86 is opened, and into pressure chamber 78 to cause the movement of piston 74 and the corresponding movement of slide valve 48 in rotor housing 24 in the embodiment of FIG. 1.

When it is desired that the slide valve should be moved so as to unload the compressor, pressure chamber 78 is vented through solenoid valve 84 into suction subarea 42 of rotor housing 24. Further, although not illustrated, certain screw compressor assembly embodiments include an oil injection feature, as is illustrated in U.S. Pat. No. 4,780,061, which is assigned to the assignee of the present invention and which is incorporated herein by reference, by which oil is injected directly into working chamber 30 of rotor housing 24 from sump 80.

It will readily be appreciated that what is discharged from discharge port 46 of rotor housing 24 when the compressor is in operation is a compressed refrigerant gas heavily laden with the oil which makes its way into the working chamber of the compressor from many locations as described above.

Figure 3:
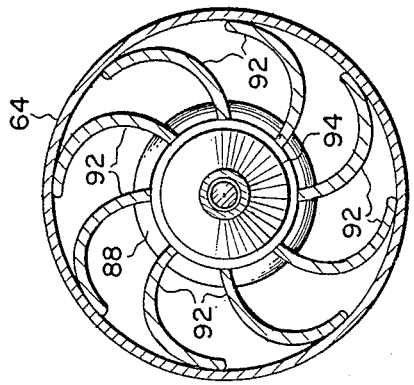
FIG. 3 is a sectional view taken along line 3—3 of FIG. 1.

The mixture of oil and refrigerant gas discharged from compressor section 14 enters oil separator portion 16 through inlet 62 and impinges on body 94 The mixture of refrigerant gas and oil is forced by its interaction with body 94 to undergo a smooth transition from essentially axial flow to a combination of axial and radial flow within separator element 54. The mixture is next fed into swirl vanes 92 which are best illustrated in FIG. 3. The vanes 92 impart an initial rotational or swirling motion to the mixture which is in a predetermined direction and which is cooperative with the orientation of the helical passage defined within separator element 54 by ramp 68, shell 64 and inner cylindrical column 66.

The gradual and smooth directional changes imparted to the mixture in the upstream portion of the separator element are purposeful and minimize pressure drop in the heavily oil-laden compressed refrigerant gas as it enters the oil separator element 54. As the high pressure mixture moves through separator element 54, the centrifugal force developed within the mixture, due to its helical flow path, causes the heavier oil to migrate radially outward within the separator element. Therefore, as the mixture exits the helical flow path at the downstream end 110 of helical ramp 68, the separated oil within the separator element is primarily located along the inside face 112 of shell 64. Such oil is travelling in a downstream direction, carried both by its downstream inertia and the continued downstream flow of the gas, toward drain field perforations 96 at the downstream end of cylindrical shell 64 of the separator element.

As the separated oil arrives in the perforated area of shell 64 of the separator element the continued swirl of the gas causes the separated oil to pass through perforations 96 into sump housing 56. Additionally, the pressure interior at the downstream end of element 54 will be slightly elevated with respect to the pressure interior of sump housing 56 due to a predetermined pressure drop induced by perforations 96. This slight positive pressure further facilitates the driving of oil through the perforations 96 at the downstream end of the separator element.

The gas, from which a majority of the oil has now been separated, is next forced to make a 180° turn around the downstream end of extension 104 of cylindrical column 66. This forced directional change in combination with the impingement of the gas on end plate 98 causes the further disentrainment of any oil which remains entrained in the gas. The gas is next caused to make a second 180° directional change so as to enter discharge conduit 100 and to exit the oil separator portion 16.

Figure 4:
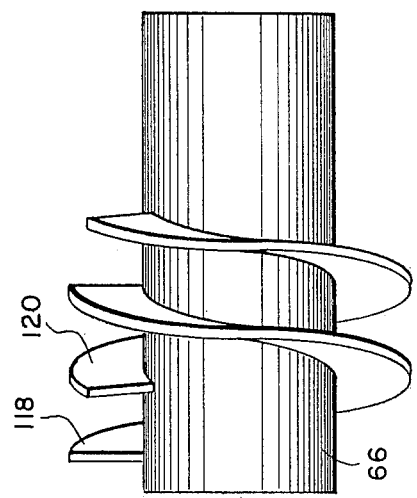
FIG. 4 illustrates an alternative embodiment of the helical ramp portion of the oil separator of the present invention.

It should be noted, referring to FIG. 4, that ramp 68, which is illustrated in FIGS. 1 and 2 as a unitary ramp winding through in excess of 360°, can be replaced by two or more helical members 118 and 120. These members, which wind through 360° or less, may be preferable to the use of a unitary ramp from the standpoint of cost and ease of separator element fabrication. Members 118 and 120 will typically overlap or will, to some extent, be nested within one another as is illustrated in FIG. 4.

Figure 5:
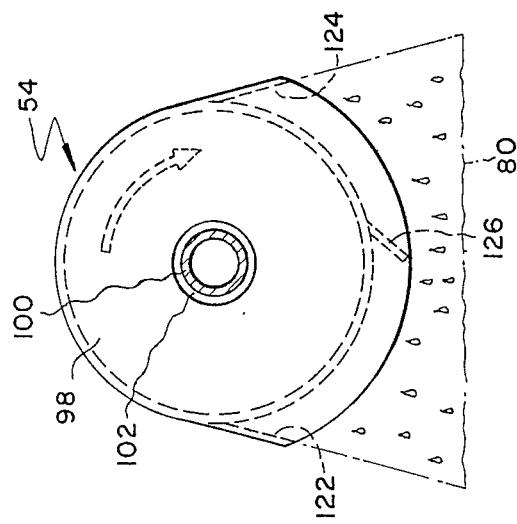
FIG. 5 is a view taken along line 5—5 of FIG. 2.

FIG. 5 illustrates directing baffles 122, 124 and 126 which generally shield the drain field on the exterior of separator element 54. These baffles direct separated oil downward into sump 80 and break up the continued swirl of the oil, in the direction indicated in FIG. 5, as it exits the drain field perforations 96. Finally it should be noted that additional tuning of the oil separator element to eliminate noise at predetermined frequencies can be accomplished by adding weights, not shown, at the generally downstream end of the separator element.

The physical isolation of oil separator element 54 from discharge conduit 100 due to the existence of gap 102 therebetween, the nesting and selective dimensioning of the discharge conduit within the upstream end 104 of cylindrical column 66 and the employment of an outer separator shell 64 which is solid except, generally, at its upstream end where an oil drain field is located, has proven to significantly reduce the production and transmission of noise, both in general and at predetermined frequencies, out of the oil separator portion of the compressor assembly.

While the noise attenuating oil separator apparatus of the present invention has been described in the context of a preferred embodiment, it should be apparent that there are many modifications which might be made to the apparatus and its application which are within the scope of the invention. Therefore, the invention should not be construed as being limited other than by the language of the claims which follow.

What is claimed is:

1. Oil separation apparatus for a screw compressor, comprising:
    housing means, defining a sump, for storing oil which has been separated from a gas compressed within said compressor;
    an oil separator element, disposed interior of said sump housing means, said separator element including a cylindrical outer shell and a cylindrical inner column between which a helical flow path is defined, said outer shell being solid along said helical flow path so that the entirety of the mixture discharged from said compressor is constrained to travel the entire length of said helical flow path within the confines of the solid portion of said outer shell and said outer shell defining at least one aperture, downstream of said helical flow path, through which oil separated from said gas passes into said sump; and
    means for abating noise, including a pair of generally tubular nested members, said means for abating noise defining a flow path downstream of said helical flow path, through which gas from which oil has been separated within said separator element must pass in order to exit said housing means and a first one of said nested pair of generally tubular members penetrating said separator element without physically contacting said separator element in the location of said penetration.

2. Noise abating oil separation apparatus according to claim 1 wherein said separator element is closed at its downstream end and defines an aperture which is penetrated by said first one of said generally tubular members of said nested pair.

3. The noise abating oil separation apparatus according to claim 2 wherein the second one of said nested pair of generally tubular members extends downstream of said helical path into the proximity of said closed end of said separator element and is itself penetrated, without physical contact, by the portion of said first one of said nested pair which penetrates the aperture defined by the closed end of said separator element.

4. The noise abating oil separation apparatus according to claim 3 wherein said second one of said nested pair of generally tubular members defines a closed flow path from the interior of said separator element to a discharge opening in said housing means.

5. The noise abating oil separation apparatus according to claim 4 further comprising a solid partition which is spaced apart from and faces the end of said second one of said nested pair of generally tubular members within said separator element, said partition cooperating with said nested pair to define a flow path within said separator element, downstream of said helical flow path, in which gas from which oil has been separated is caused to undergo first and second generally 180° turns within said separator element in order to pass to said discharge opening in said housing means.

6. The noise abating oil separation apparatus according to claim 5 wherein said second one of said nested pair of tubular members is an integral extension of said inner column of said separator element.

7. The noise abating oil separation apparatus according to claim 5 wherein said second one of said nested pair is a discrete element attached to and extending downstream of said inner column of said separator element.

8. The noise abating oil separation apparatus according to claim 5 wherein said inner column includes a pressure housing disposed internal thereof, said pressure housing having a face which functions as said solid partition.

9. The noise abating oil separation apparatus according to claim 5 wherein said separator element includes two discrete helical ramps each of which winds through 360° or less, said ramps cooperating with said shell and said inner column to define said helical flow path.

10. The noise abating oil separation apparatus according to claim 5 wherein said outer shell defines a plurality of apertures generally downstream of said helical flow path and in the lower portion of said shell, said plurality of apertures defining a drain field through which oil separated from said compressed gas flows into said sump, said apertures being of a predetermined size to facilitate the development of a pressure drop between the interior of said separator element and the interior of said housing means.

11. The noise abating oil separation apparatus according to claim 10 wherein said separator element includes baffle means for directing oil into said sump subsequent to having passed through said drain field apertures.

12. Apparatus for use in conjunction with a screw compressor in a screw compressor assembly comprising:
    an oil sump housing;
    an outer cylindrical shell into which all of a mixture of compressed refrigerant gas and entrained oil passes upon discharge from said screw compressor, said shell being solid at an upstream end where said mixture is received and said shell defining an oil discharge opening and a discharge gas opening downstream of the solid portion of said shell, said oil-discharge opening being an opening through which separated oil passes out of said shell into said sump;

a generally cylindrical column, including an open-ended downstream extending portion, disposed interior of said shell;

means for defining a helical flow path within the solid portion of said shell and between said shell and said inner column, the entirety of the mixture discharged from said compressor being constrained to travel through said solid portion of said shell and said downstream extending portion of said inner column extending downstream of the termination of said helical flow path defined within the solid portion of said shell; and discharge conduit means penetrating, without contact, said discharge gas opening in said outer shell, said discharge conduit further penetrating said open-ended extension of said inner column within said shell, said downstream extending portion of said inner column and the portion of said discharge conduit which penetrates said second aperture of said shell cooperating to form a nested pair of members adapted to abate noise at predetermined frequencies within said compressor assembly.

13. The apparatus according to claim 12 wherein said second opening in said cylindrical shell is defined in an otherwise closed end of said separator element and wherein said downstream extending portion of said inner column extends into the proximity of said closed end of said separator element.

14. The apparatus according to claim 13 wherein said discharge conduit defines a closed flow path out of the interior of said separator element and out of said oil sump housing.

15. The apparatus according to claim 14 further comprising a partition internal of said inner column, said partition being spaced apart from and facing the end of said discharge conduit which penetrates said separator element and said partition cooperating with said downstream extension of said inner column and the portion of said discharge conduit which penetrates said second aperture of said shell to define a flow path within said separator element in which gas is caused to undergo first and second generally 180° turns within said separator element in order to enter said discharge conduit.

16. The apparatus according to claim 15 wherein said downstream extending portion of said inner column is an integral extension of said inner column.

17. The apparatus according to claim 15 wherein said downstream extending portion of said inner column is a discrete element attached to the end of said inner column.

18. The apparatus according to claim 15 wherein said inner column includes a pressure housing disposed internal thereof, said pressure housing having a face which functions as said solid partition.

19. The apparatus according to claim 15 wherein said means for defining a helical flow path includes two discrete helical ramps each of which winds through 360° or less, said ramps cooperating with said shell and said cylindrical column to define said helical flow path.

20. The apparatus according to claim 15 wherein said separator shell defines a plurality of oil drain apertures downstream of the solid portion of said shell and in the lower portion thereof, said plurality of apertures defining a drain field through which oil separated from said compressed gas flows out of said shell and into the interior of said oil sump housing, said apertures being of a predetermined size to cause the development of a pressure drop between the interior of said separator shell and the interior of said oil sump housing so as to facilitate the driving of separated oil through said apertures.

21. The apparatus according to claim 20 further comprising baffle means for directing oil into said sump subsequent to having passed through said drain field apertures.

* * * * *